United States Patent [19]

Goshorn et al.

[11] Patent Number: 4,481,768

[45] Date of Patent: Nov. 13, 1984

[54] PNEUMATIC CONTROL SYSTEM FOR MACHINES

[75] Inventors: Lawrence A. Goshorn, Rancho Santa Fe; C. Earl Bradley, Encinitas, both of Calif.

[73] Assignee: International Robomation/Intelligence, Carlsbad, Calif.

[21] Appl. No.: 292,903

[22] Filed: Aug. 14, 1981

[51] Int. Cl.³ .......................... F15B 1/06; F15B 9/00; F15B 13/044

[52] U.S. Cl. ....................................... 60/327; 60/388; 60/407; 60/410; 60/415; 60/418; 91/361; 91/429; 91/444

[58] Field of Search ................. 60/327, 368, 370, 388, 60/407, 410, 412, 415, 418; 251/129, 141; 137/624.13, 624.15; 91/429, 361, 363, 444, 448

[56] References Cited

U.S. PATENT DOCUMENTS

| | | | |
|---|---|---|---|
| 1,905,080 | 4/1933 | Whittles | 91/444 X |
| 2,644,307 | 7/1953 | Blair | 60/410 |
| 3,011,110 | 11/1961 | Ho et al. | 91/363 R |
| 3,038,449 | 6/1962 | Murphy, Jr. et al. | 91/363 R |
| 3,222,997 | 12/1965 | Blatt et al. | 91/448 X |
| 3,295,421 | 1/1967 | McCormick | 91/363 R |
| 3,462,115 | 8/1969 | Barker | 91/429 X |
| 3,521,535 | 7/1970 | Oelrich | 91/361 X |
| 3,788,194 | 1/1974 | Burns | 91/459 X |
| 4,262,784 | 4/1981 | Sibeud | 91/429 X |

Primary Examiner—Irwin C. Cohen
Attorney, Agent, or Firm—Brown, Martin & Haller

[57] ABSTRACT

A pneumatic control system for machines that provides precise incremental or continuous direction, position, velocity and acceleration control of a variety of machine functions, such as rotary or linear motions, tool positioning and the like. A compressed air supply is maintained accurately at a preselected minimum pressure necessary for a particular operation, by a digitally pulsed air flow control system. Air flow and pressure to the associated actuating mechanisms is also controlled by a digital dithering technique using individual sharp pulses of air, each of which instantly breaks the static friction of the mechanism and causes a discrete precise increment of movement, with rapid consecutive pulses providing continuous motion. The direction, amount, acceleration and speed of travel are controlled by varying the pulse width and rate of air flow and pressure as necessary and for efficiency in air consumption. The system is computer controlled and is readily adaptable to numerically controlled machines, industrial robots and the like.

13 Claims, 16 Drawing Figures

PNEUMATIC CONTROL SYSTEM FOR MACHINES

BACKGROUND OF THE INVENTION

Control systems for precise operation of mechanisms such as machine tools, industrial robots and the like are usually electrical or hydraulic. Both types are expensive and use bulky and heavy motors and actuators and much wiring or tubing capable of carrying considerable power or hydraulic pressure. In large machine tools the weight is not critical, but on any moving apparatus where the power drive or structure becomes part of the load, such as a jointed arm robot, any excess weight on the moving components adds to the load that must be moved and this increases the power requirements, and thus the cost.

Both electrical and hydraulic mechanisms are capable of accurate positioning over reasonable distances and are used extensively in numerically controlled machines, but both have limitations in small and precise motions and distances. This is due primarily to static friction in the various mechanisms that must be overcome each time a mechanism is moved. Power must build up to a particular point at which the static friction is broken and the mechanism will move. In making very small movements the resultant jerk and inertia of the moving parts can make it difficult to stop at a precise position. In electrical and some hydraulic systems a dithering technique has been used in which a constant dithering signal is applied to the moving parts to keep them in constant infinitesimal motion to continuously break the static friction. In many instances, however, this is undesirable and impractical.

Pneumatic power systems are much lighter and simpler and considerably lower in cost than equivalent hydraulic or electrical systems, but are usually not considered suitable for precise servoed machine control due to the compressibility and cushioning effect of air as a driving medium. A pneumatic power system would make it possible to greatly reduce the weight, complexity and cost of industrial robots in particular and power actuated machinery in general.

SUMMARY OF THE INVENTION

The pneumatic control system illustrated herein is capable of operating a variety of machines, industrial robots and the like, with great precision and with a minimum of associated power and control apparatus. One feature that makes the system practical is the technique of controlling air flow through valves that are actuated by digital pulse signals in a particular manner.

A supply of compressed air is maintained in a reservoir at a precise predetermined minimum pressure necessary for a particular operation, resulting in minimum wastage of air and considerable savings in the energy needed to compress the air. Air flow to a particular actuator is controlled by a directional control valve and a speed control valve, which are digitally pulsed to provide the required motion.

With the digital dithering technique each pulse signal provides a sharp pulse of air pressure that instantly overcomes the static friction of the associated mechanism and produces a precise increment of movement that is under a feedback control. In conventional dithering the signal is continuous and the power application is additional. The digital dithering technique uses individual pulses, each of which breaks the static friction and moves the mechanism. Thus a single pulse provides just as positive and precise a motion as continuous pulses.

A pulse generator controlled by a computer produces the digital pulses, the pulse rate and pulse width being under variable control to provide the required increments speed and acceleration of movement. Differential dithering, by which more power is applied in one direction of movement than the other, can be used to support or overcome an offset load, and also to provide more precise positioning of the load or working unit.

The primary object of this invention, therefore, is to provide a new and improved pneumatic control system for machines.

Another object of this invention is to provide a new and improved pneumatic control system in which air flow is controlled by digitally pulsed valves, with each pulse breaking the static friction of the mechanism and providing a precise increment of movement.

Another object of this invention is to provide a new and improved pneumatic control system that is adaptable to a variety of machines, industrial robots and the like.

A further object of this invention is to provide a new and improved pneumatic control system that is simpler and lighter but capable of more precise operation than a comparable hydraulic or electrical system.

A further object of this invention is to provide a new and improved pneumatic control system that is particularly useful in robots and that provides optomized and efficient use of pressurized air.

A further object of this invention is to provide a new and improved pneumatic control system that is particularly adapted for computer control.

Other objects and advantages will be apparent in the following detailed description, taken in conjunction with the accompanying drawings, in which.

DESCRIPTION OF THE PREFERRED EMBODIMENT

Figure 1:
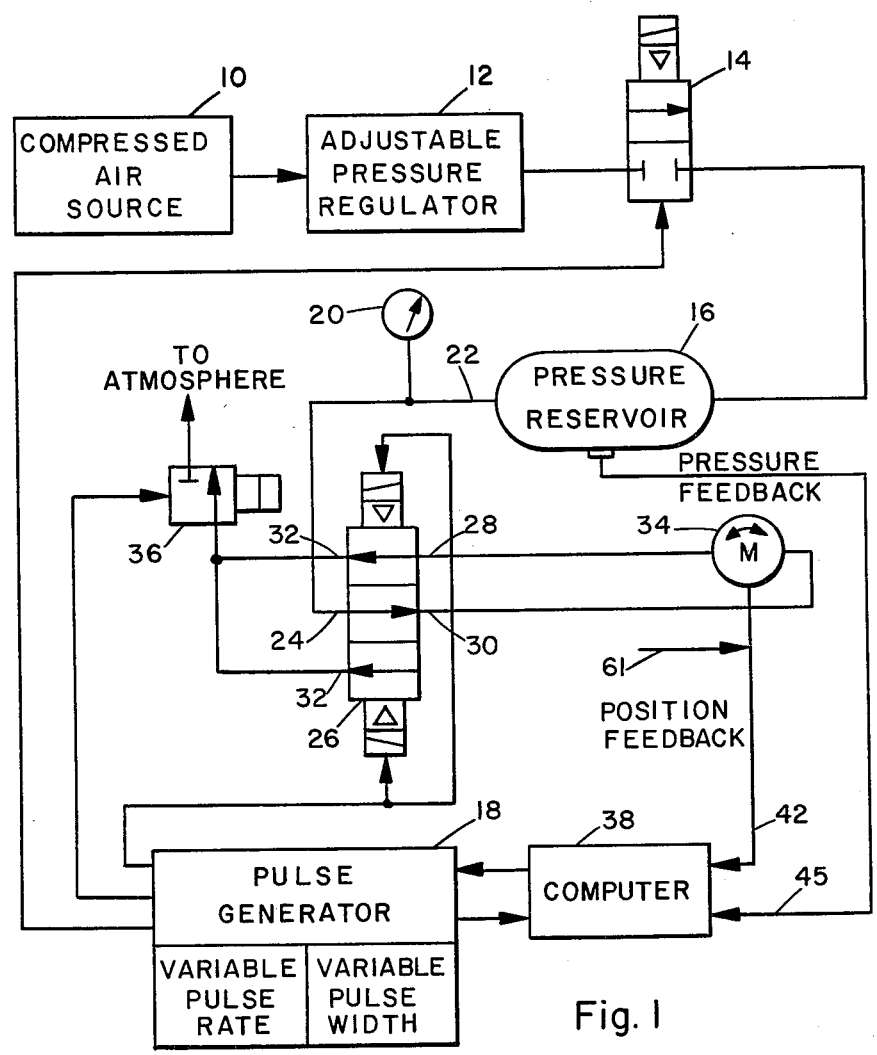
FIG. 1 illustrates schematically the pneumatic control system with a single operation channel.

In the system illustrated in FIG. 1, compressed air is obtained from a suitable source 10 through a pressure regulator 12, which may be a standard shop air supply or compressor installation. Usually this type of air supply is at a much higher pressure than needed for the present system and is not at a particularly constant pressure. Accurate air pressure is necessary for proper calibration and efficiency of the system, so the air is fed through a solenoid, pulse operated pressure control valve 14 to a reservoir 16. Valve 14 is actuated by digital pulse signals from a pulse generator 18, the action of which will be described later, with the air thus entering the reservoir 16 in pulses. The pulsing of air provides a precisely controlled air pressure in pressure reservoir 16, which air pressure is controlled using closed loop pressure feedback under computer control. Further the air supplied through the pulses can be changed quickly enough to be able to maintain a relatively precise, given air pressure in reservoir 16, regardless of the air draw through line 22 and while using a relatively small reservoir 16. To prevent outgoing pressure pulses and standing waves, the reservoir is internally damped in any suitable manner, such as by an insert of resilient material, baffles, or the like, the arrangement being well known. By this technique a very precise constant pressure can be maintained in the reservoir and a suitable pressure guage 20 is provided at the outlet 22 for visual checking.

Outlet 22 is coupled to the inlet 24 of a solenoid operated, two way directional control valve 26, which has a pair of control outlets 28 and 30 and a pair of vent outlets 32. The control outlets 28 and 30 are coupled to opposite sides of a reversible air motor 34, such as a positive displacement type or a conventional vane motor. Valve 26 is also actuated by digital pulse signals from the pulse generator 18 for rapid directional control of motor 34.

Vent outlets 32 are both coupled to a solenoid operated speed control, air valve 36, that is also actuated by pulse generator 18 to vent pulses of air to the atmosphere. The speed control valve 36, as controlled by the pulse generator 18, vents air pulses of controlled width and controlled timing and thus controls the speed of motor 34, while valve 26 controls the direction, and can control the speed, of rotation. Thus air valves 14, 26 and 36 function to provide controlled air pressure and volume to obtain controlled movement, speed and economy.

Pulse generator 18 provides controlled variable pulse rate and pulse width signals to solenoid control valves 14, 26 and 36. The circuitry for providing this is well known and suitable pulse generators are currently available. Operation of the system is controlled by a computer 38, which can be an available general purpose type in which digital type programs can be stored for a variety of operations. A pressure feedback 45 from reservoir 16 is supplied to computer 38 for reference, so that the required pressure in the reservoir can be maintained by, for example, increasing or decreasing the number of control pulses from pulse generator 18 to solenoid valve 14. A position feedback 42 from motor 34 or from some other device that reflects the actual position of a workpiece or other mechanism through line 61, provides the computer with positional data on the mechanism being driven.

Figure 2:
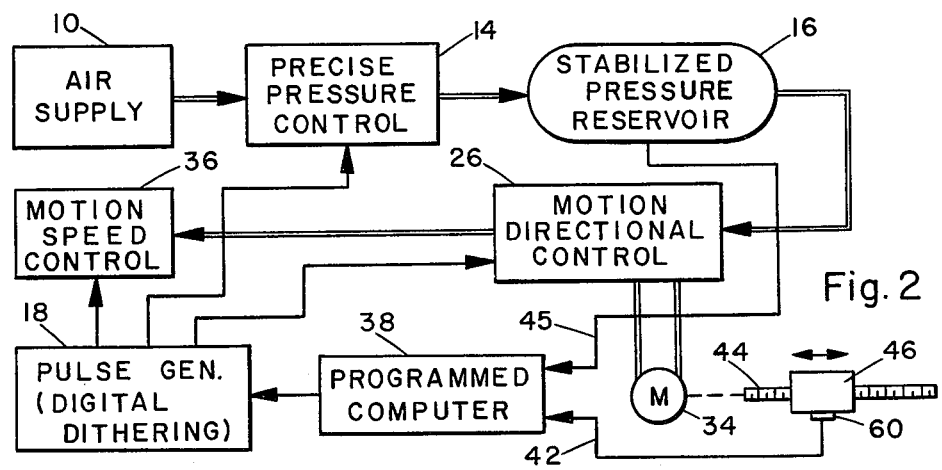
FIG. 2 is a block function diagram of the system.

FIG. 2 illustrates the system with the valve functions indicated and motor 34 is shown connected to a rotary jack screw 44 on which is a traveller 46, as an example. A single operating channel is shown for purposes of description, but it will be obvious that any reasonable number of channels, each with its own speed and directional control valves and if desired its own separately controlled air supply, may be used. The system is thus adaptable to a variety of multiple axis control machines.

Figure 10:
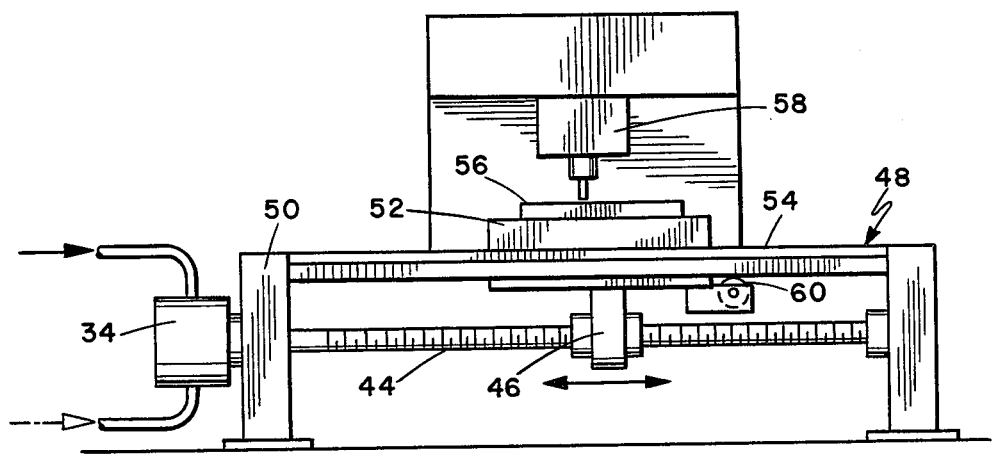
FIG. 10 is a side elevation view of a typical machine tool incorporating one drive channel of the pneumatic system.

One example of a machine is illustrated in FIG. 10, which shows a milling machine 48 in basic form. Motor 34 is mounted on the base frame 50 and drives the longitudinal jack screw 44. Traveller 46 is attached to a carriage 52 which rides on longitudinal ways 54 and carries a part 56 under the tool head 58. A roller type indicator 60 is mounted on carriage 52 and rides on ways 54 to measure the motion of the carriage and provide the position feedback through 61 and 42 to the computer 38. Any suitable position indicator or transducer can be used, preferably of a micrometer type capable of providing very precise readings in order to be compatible with the accuracy of the system, and that provides electrical signal information reflecting the precise readings to the computer 38.

In a conventional pneumatic system, air pressure is usually applied to an actuator or motor through a valve, which may be a simple on and off or a variable flow rate type valve. All mechanisms actuated by fluid pressure are usually close fitting in order to contain the pressure and thus have a certain amount of friction. To start an actuator moving, this starting or static friction must first be overcome by sufficient pressure, then the actuator will move until the pressure drops below that necessary to sustain motion.

Figure 3:
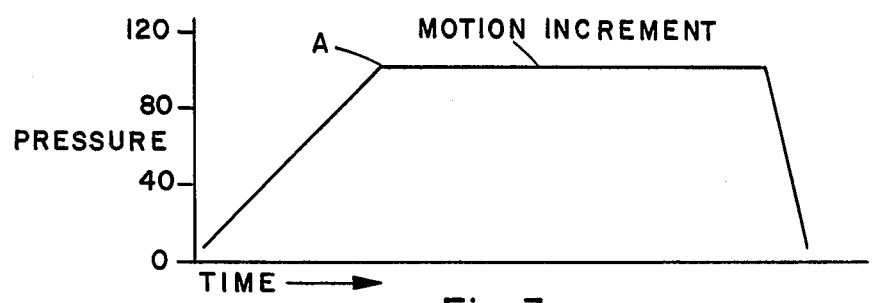
FIG. 3 is a graph of a single operating signal of a prior art type pneumatic system.

As illustrated in FIG. 3, the initial pressure builds up gradually until at point A the static friction is overcome and drops off rapidly as the control function is completed B. Once the static friction is broken, the pressure necessary to sustain motion may actually be less, depending on the mechanism being driven. As illustrated the static friction breaking pressure is about 100 units on an arbitrary scale which could be p.s.i., Pascals, or any other suitable measure.

In the digitally pulsed system the air pressure is applied in very sharp pulses through valves which are capable of fast poppet or snap action between fully closed and fully open, so that full working pressure is applied almost instantly. The sudden pulse of pressure breaks the static friction of the mechanism immediately and moves the mechanism a small increment of distance, depending on the duration of the pulse. Repeated pulses produce consecutive incremental movements and, if the pulse rate is rapid enough, the result can be a relatively smooth steady motion. Also speed and acceleration can be increased by increasing the air pressure in reservoir 16 or increasing the pulse duration for the same hertz.

Figure 4:
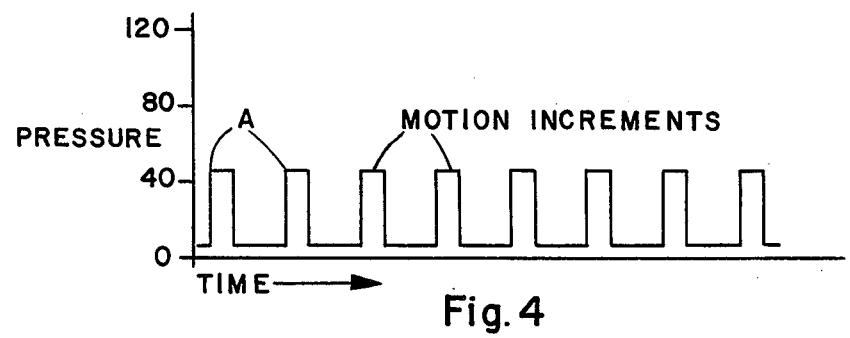
FIG. 4 is a graph of a typical digitally pulsed signal of the present invention.

Since the static friction is broken with each pulse by the sharp shock of the air pressure, less air pressure is needed in line 22 to move the mechanism. It has been found in extensive testing that the required pressure is on the order of one third to one half of the pressure required without the pulsed technique. FIG. 4 illustrates a typical pulsed signal train on the same pressure scale as that of FIG. 3, the static friction being broken at point A in each pulse. This provides a digital dithering effect in a repetitive pulse signal, but the dither is a part of each pulse and not a separate continuous vibration.

The reduced pressure requirement enables an air optimization technique to be used, in which reservoir 16 is charged only with the air pressure necessary to perform a particular operation. The pulsed control of valve 14 enables a very precise air pressure to be maintained in the reservoir, with the air under pressure being replenished in pulse increments as it is used in the system. By using the optimum air pressure, the energy requirements for generating that pressure can be minimized, resulting in a great reduction in energy cost compared to the air supply usually stored and/or consumed.

Figure 8:
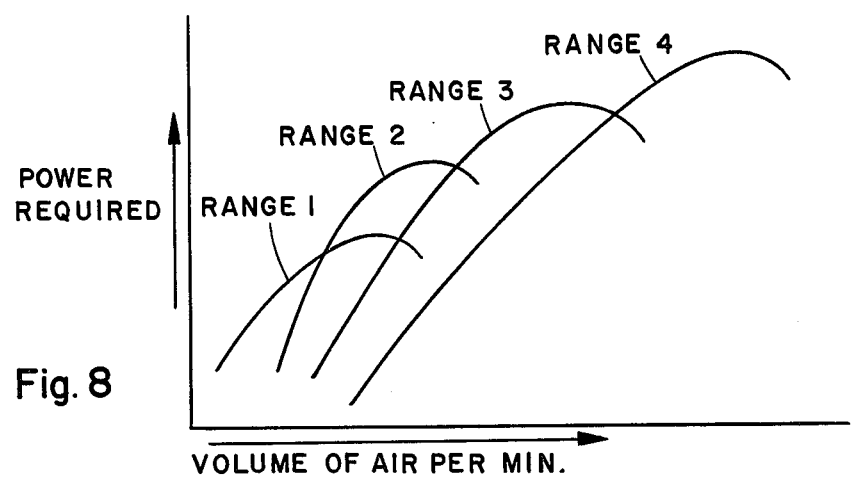
FIG. 8 is a graph of several air pressure ranges which can be selected to optimize air pressure use in the system.

The computer 38 may be used to advantage to optimize the air utilization. FIG. 8 illustrates a family of curves representing different ranges of optimum air pressure at which a certain amount of power will be provided from a particular volume of air flow. These curves can be readily calculated and programmed into the computer, which would then select the optimum pressure range at which the system requirements would be fulfilled for a particular operation.

Figure 9:
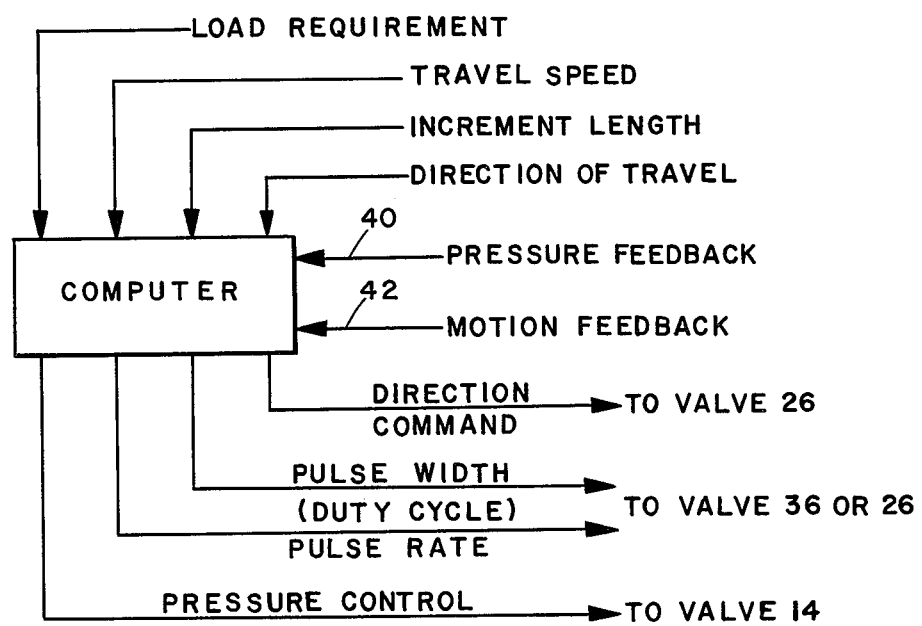
FIG. 9 is a diagram of the computer functions.

In FIG. 9 the basic inputs and outputs of the computer are indicated. For a specific operation the load to be moved or overcome is known and this basically determines the pressure to be maintained in reservoir 16 through valve 14. The direction of travel determines the operation of valve 26 to drive the motor 34 in the required direction. The speed of travel and the length of each increment of travel determines the pulse rate and pulse width, or duty cycle, of the pulses to valve 36. Pressure feedback 45 from the reservoir monitors the pressure and governs the operation of valve 14. Motion feedback 42, such as from indicator 60 through line 61, monitors the position of the mechanism and enables the computer to make a comparison with a programmed position. The system is thus compatible with numerically controlled equipment, in which various mechanisms are moved to and between specific locations identified in a memory.

Figure 5:
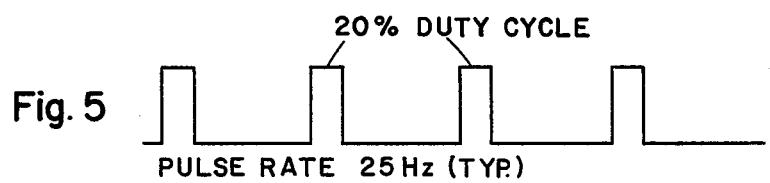
FIG. 5 illustrates a digitally pulses signal of a low duty cycle.
Figure 6:
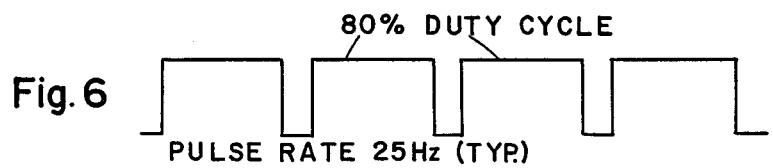
FIG. 6 illustrates a digitally pulsed signal of a high duty cycle.

The speed of motion is not only controlled by pulse rate but also by pulse width, as indicated in FIGS. 5 and 6. In FIG. 5, at a typical pulse rate of 25 Hz the air pressure pulses are on for 20% of each pulse for a rather low duty cycle. The mechanism would thus move only a small increment during each pulse. In FIG. 6 the pulse rate is the same but the pulse width has been increased to 80% of each pulse, for a high duty cycle. The mechanism would move much further during each pulse, resulting in a greater overall rate of travel. Alternatively, the pulse rate can be increased with the same pulse width, also achieving a greater overall rate of travel. For smooth continuous motion a rapid pulse rate or a longer duration pulse is desirable, within the operating limits of the valves, so speed can be controlled by varying the duty cycle of air valve 36.

Single pulses can also be used for incremental motion, as for indexing or spacing. For repetitive spacing a suitable slow pulse rate can be used, with the pulse width set for the required increment of motion.

In test apparatus it has been found that extremely small increments of movement can be obtained with consistent precision. Using a micrometer type feedback and transducer or digital indicator, individual increments of movement on the order of 0.0005 in. (0.0127 mm) and even 0.0002 in. (0.005 mm) could be obtained.

Figure 11:
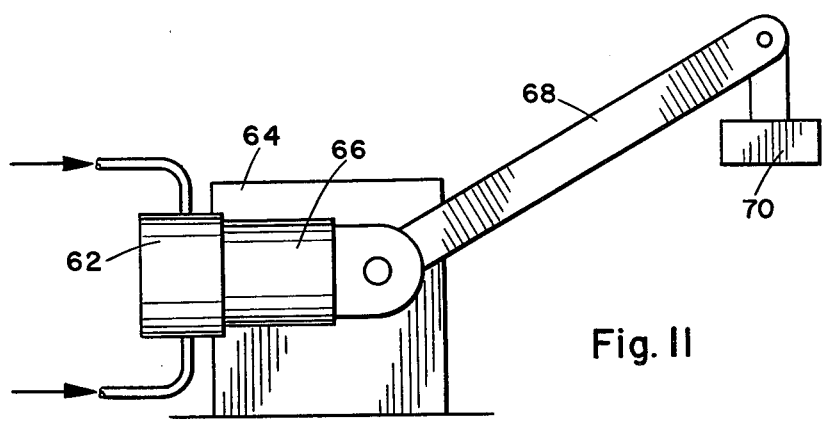
FIG. 11 is a side elevation view of a robot type machine with an offset loaded arm.
Figure 12:
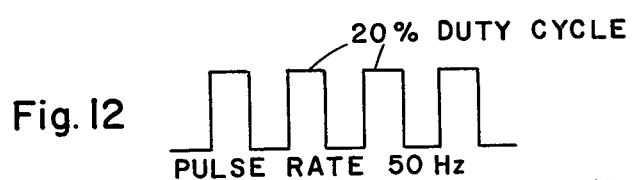
FIG. 12 illustrates a pulse signal of low duty cycle but high pulse rate.

A unique feature of the digital dithering technique is the use of differential dithering for certain purposes. One such use is in the apparatus illustrated in FIG. 11, in which a motor 62 is mounted on a base 64 and, through a reduction drive 66 moves a cantilevered arm 68 vertically. This structure is typical of some industrial robots, in which the arm 68 would carry a load 70, such as a tool, gripping device, or the like. Due to gravity there is thus a constant downward load on the arm and the mechanism tends to creep unless constantly corrected. This is particularly true with the usual robot arms which contain heavy actuators and associated supporting structure.

Figure 7:
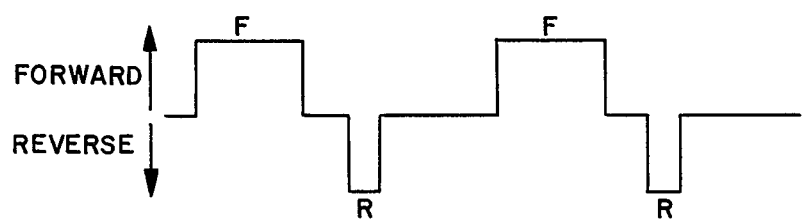
FIG. 7 illustrates a differentially pulsed signal.

By using a differential pulse signal as indicated in FIG. 7, an offset load such as the cantilevered arm can be maintained in position. In this mode, the signal to valve 26 is alternately reversed to drive the motor forward and in reverse, the forward motion raising arm 68 in this instance and the reverse motion lowering the arm. At the same time valve 36 is pulsed to provide a longer duty cycle F on the forward side and a shorter duty cycle R on the reverse side. More upward motion than downward motion is thus applied to the arm. With a suitable position feedback to the computer, the duty cycles can be adjusted to hold the arm precisely in place when required.

Figure 13:
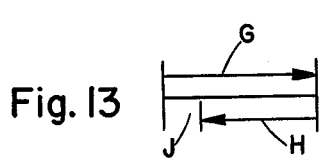
FIGS. 13 and 14 illustrate the fractional motion obtainable by differential dithering.
Figure 14:
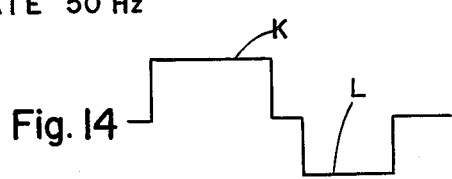

Another use of differential pulsing is to more accurately position, for example, the workpiece 56. While this system provides very precise and accurate positioning of the workpiece through short and precise distance movements of the workpiece, which preciseness is increased with the feedback information loop 42 and 61, even more precise positioning of the workpiece is possible through the use of the differential pulse signal mode. Referring to FIGS. 13 and 14, a pulse K, having a given duration would move a workpiece a given distance G. A reverse pulse L having a shorter duration would move the workpiece in the opposite direction a distance H. This leaves an incremental forward movement of the workpiece J, that is a very short and yet can be precisely set distance of movement of the workpiece, that exceeds the preciseness of movement from a given pulse in the system. This is made possible by the unique feature of the digial dithering technique in which each pulse overcomes the friction and inertia of the workpiece and moves the workpiece a given distance separately and on its own.

Figure 15:
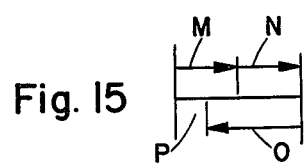
FIGS. 15 and 16 illustrate another signal arrangement using differential dithering.
Figure 16:
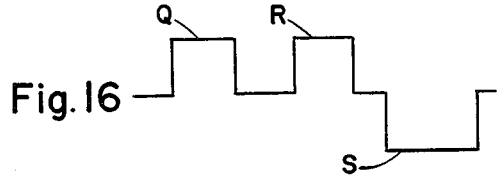

Additionally, referring to FIGS. 15 and 16, the differential pulse mode can also be used for example where two pulses in a given direction, pulses Q and R of a given duration, are used to move the workpiece a distance M and N and a reverse pulse S is used to move the workpiece a given distance O. This again provides an overall precise short incremental movement of the workpiece a distance P. This further illustrates the computer controlled operation of the system to provide precise feedback controlled movements and positioning of workpieces, which can be rapidly applied to the system and to the workpiece.

It may be understood that in operation of the system, pulse signals from pulse generator 18 to control valve 36 may be a constant signal that effectively holds valve 36 in the open position. Then the pulse signals to valve 36 would be supplied to control valve 26, see FIG. 9, wherein control valve 26 would function both to control air flow direction (forward or reverse) to air motor 34 and to also pulse the air flow that would otherwise be done by valve 36. Thus valve 26 would accomplish both functions. Also it may be understood that the pulse rate and/or pulse duration of FIGS. 5, 6, 7, 12, 14 and 16 may be selectively varied to provide changes in air motor drive and movement of the workpiece 56 for changes in velocity, acceleration, direction and position.

By using a pneumatic system instead of hydraulic or electrical system, the weight, complexity and cost are greatly reduced. The pressures involved in the present system are much lower than with a hydraulic system and the compression and storage facilities can be simpler. Hoses and fittings are lighter, more flexible and adaptable to small mechanisms. With industrial robots in particular the reduction in weight and/or the simplification of mechanical linkages through the joints of the actuating mechanisms simplifies the design of the structure, since it is not necessary to build in so much reinforcement to support the actuating system. The great precision of movement attainable with the system makes it possible to carry out a variety of critical operations by automatic or remote control.

Having described our invention, we now claim:

1. A pneumatic control system for machines, which system is responsive to a source of compressed air, comprising:
    a pressure storage reservoir having an outlet;
    a pressure control valve means coupled between the source of air and the reservoir for controlling air flow to said reservoir;
    a pneumatic actuator;
    a directional control valve coupled between said reservoir outlet and said actuator and having a pair of control outlets and at least one vent outlet;
    a speed control valve coupled to said vent outlet and having an outlet to atmosphere;
    and a pulse generator means connected to said directional control valve and to said speed control valve to open and close the valves in timed short pulses and cause corresponding short pulses of air pressure to be respectively applied to and vented from said actuator.

2. A pneumatic control system according to claim 1, wherein said pulse generator means varys the pulse rate and width of the timed pulses.

3. A pneumatic control system according to claim 2, and including means for maintaining a pressure in said reservoir so that each sharp short pressure pulse is sufficient to break the static friction of the actuator substantially instantaneously upon application of the pulse.

4. A pneumatic control system according to claim 3, wherein said pulse generator means is connected to said pressure control valve means to open and close the valve in timed sharp pulses.

5. A pneumatic control system according to claim 4, and including a computer having pulse programming means connected to said pulse generator means;
    and a pressure indicating feedback means from said reservoir to the computer for controlling timing of the pulses to said pressure control valve means.

6. A pneumatic control system according to claim 5, wherein said computer includes means for determining the optimum pressure necessary in said reservoir for a specific application and controlling the timed pulses to said pressure control valve means in accordance therewith.

7. A pneumatic control system according to claim 5, and including a position indicating feedback means from said actuator to the computer for controlling timing of the pulses to said directional control valve and speed control valve means.

8. In a pneumatic control system having a compressed air reservoir, an air driven actuator and valve means connected between the reservoir and actuator, the method of control comprising:
    opening and closing said valve means with timed sharp pulses and thereby applying short pulses of pressurized air to the actuator, each pulse having sufficient instantaneous pressure to break the static friction of the actuator;
    and admitting air from a high pressure source to the reservoir in timed sharp pulses to maintain the pressure therein at an optimum pressure necessary for a specific application of the actuator and precisely in accordance with the demand of the control system.

9. The control method of claim 8, and including varying the pulse rate of the timed pulses.

10. The control method of claim 8, and including varying the pulse width of the timed pulses.

11. The control method of claim 8, and including reversing the valve means in timed pulses to drive the actuator alternately in opposite directions, and varying the duty cycle of the timed pulses.

12. The control method of claim 11, and including applying longer pulses in one direction of the actuator than in the other.

13. A pneumatic control system which is responsive to a source of compressed air, comprising:
    a pressure storage reservoir having an outlet;
    a pressure control valve coupled between the source of air and the reservoir for controlling air flow to said reservoir;
    pulse means for providing control pulses to said pressure control valve;
    said pressure control valve being responsive to the control pulses for providing air pulses to said pressure storage reservoir, thereby providing a controlled and metered air supply to said reservoir to maintain a given air pressure in the reservoir;
    a pneumatic actuator;
    valve means coupled between said reservoir outlet and said actuator;
    and pulse means acting on said valve means for providing pulses of air from said valve means to said actuator.

* * * * *